United States Patent Office 3,421,548
Patented Jan. 14, 1969

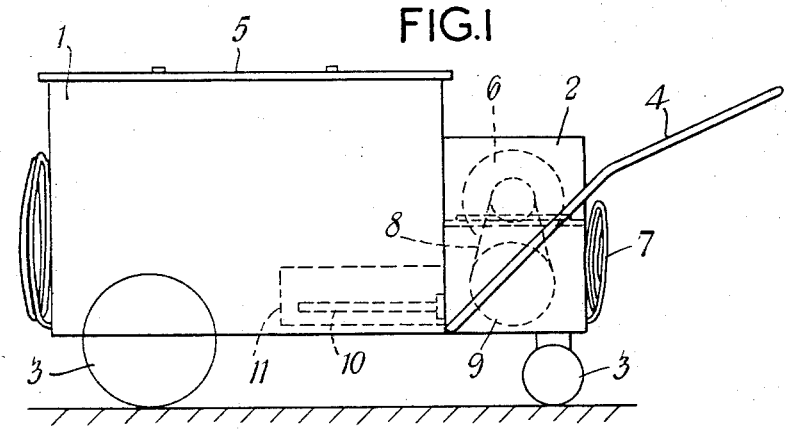
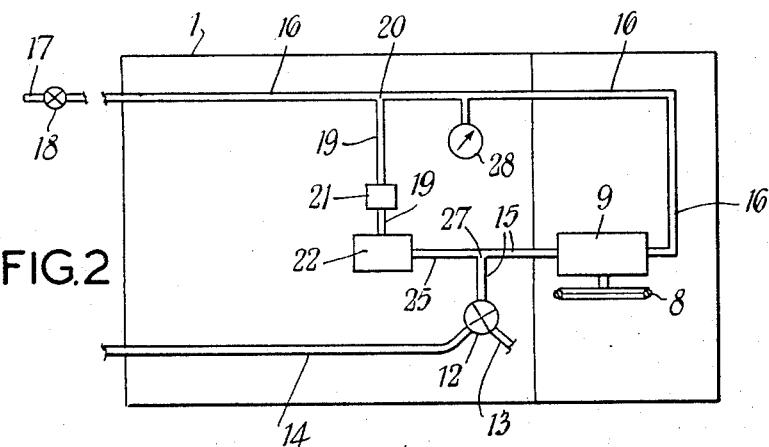
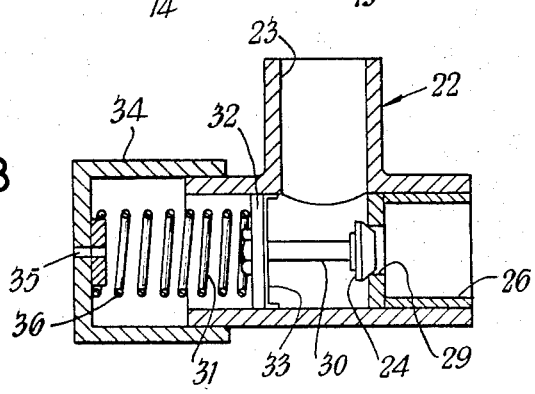

3,421,548
SYSTEM FOR DISCHARGING LIQUID UNDER PRESSURE
George Frank Hare, 174 Lynn Road, Wisbach, England
Filed Apr. 29, 1966, Ser. No. 546,437
U.S. Cl. 137—563                                       1 Claim
Int. Cl. E03b 7/07

ABSTRACT OF THE DISCLOSURE

Apparatus for discharging cleansing liquid under pressure alternatively from a storage tank and from water supply mains through a lance, comprising a pump and pipework, there being a recirculatory system in the pipework which includes a relief valve opened by inlet pressure acting on a piston and also opened by back pressure at the outlet of the relief valve.

---

This invention relates to a system for discharging liquid under pressure and is particularly, though not exclusively, concerned with providing such a system for use in cleansing poultry houses.

Poultry houses, particularly those for battery hens, are notoriously difficult to clean, mainly because the matter to be removed has become solidified and firmly adheres to the wooden structure of the house. The normal method of cleansing poultry houses is to employ a unit which supplies steam under pressure to a lance which is operated by hand to direct the jet of steam in an appropriate manner. This method is partially successful in carrying out the cleansing operation but necessarily involves the liberation of large quantities of steam into the atmosphere of the poultry house, so that the person operating the apparatus is working in unpleasant and difficult conditions. Furthermore, the effective range of hot steam from a lance is a matter of some 9 or 10 inches and the operator is never sure that the surfaces to be cleansed of colonies of bacteria and other matter, have been successfully cleansed. In a comparatively small building it is almost impossible to see the work carried out and the operator is frequently mislead into believing that because the building is full of steam, it is being cleansed.

It is the main object of this invention to provide apparatus which is capable of discharging liquid under pressure for cleaning purposes.

According to the present invention there is provided apparatus for discharging liquid under pressure, including a reservoir for the storage of liquid, a first pipe from the reservoir connected to a first port of a three way valve, a second pipe connected to a second port of the three way valve for the supply of liquid from a liquid source, a third pipe connected to a third port of the three way valve and leading to the inlet side of a pump, a fourth pipe from the outlet side of the pump to liquid directing means incorporating a control valve, a fifth pipe leading from the fourth pipe to a port on one side of the closure member of a relief valve and a sixth pipe leading from a port on the other side of the closure member of the relief valve to the third pipe, the fifth and sixth pipes thus forming a closed circuit with parts of the third and fourth pipes and the closed circuit incorporating the pump and relief valve, the relief valve being arranged such that its closure member is biased to the closed position and the pressures in both the fifth and sixth pipes tend to open the closure member.

It will be appreciated that the apparatus of the invention is capable of discharging liquid under pressure for the cleansing of many types of surfaces, for example, the cleansing of poultry houses and also the cleansing of the inner and outer surfaces of many other types of buildings, and it is to be understood that the apparatus of the invention is not to be limited to any particular application.

One embodiment of apparatus according to the invention will now be described, by way of example only, and with reference to the accompanying drawings in which:

FIG. 1 is a diagrammatic side elevation of apparatus constructed in accordance with the invention;

FIG. 2 is a plan view illustrating diagrammatically the disposition of the parts of the apparatus according to the invention; and FIG. 3 is a diagrammatic sectional view through the release valve which is part of the apparatus according to the invention.

The apparatus illustrated in the drawings is particularly designed for the cleansing of poultry houses and in which there is provided a reservoir 1, fixed to a casing 2 and having transport wheels 3 and a handle 4 for manipulation of the appliance to the desired position for use. The reservoir 1 is provided with a removable lid 5. Within the casing 2 is an electric motor 6 supplied with power via a cable 7 from an appropriate electrical power source. The motor 6 drives, via a belt 8, a pump 9, an appropriate rating for which is 80 to 200 p.s.i. although this will depend on the work it is required to perform. A convenient electric motor would be ½ horsepower.

The tank 1 contains an electric immersion heater 10 with an open top subsidiary tank 11 as a safety factor in case all liquid is drained from the tank 1 which would otherwise expose the elements of the heater 10. Liquid cannot be drained from the safety tank 11 so that no damage can result to the heater 10 even though all liquid has been taken from the tank 1.

Also provided is a three way valve 12 having three ports. Connected to a first port of the three way valve 12 is a first pipe 13 for discharging liquid into and drawing liquid from the reservoir 1. A second pipe 14 is connected to a second port of the three way valve 12 for the supply of liquid from a liquid source which may be the water mains or a storage tank. A third pipe 15 is connected to a third port of the three way valve 12 and this pipe 15 leads to the inlet side of the pump 9. A fourth pipe 16 leads from the outlet side of the pump 9 to liquid directing means 17 which may be in the form of a lance and which incorporates a control valve 18. This liquid from the reservoir 1 will include hot water at a temperature of from 110° to 212° F. and a suitable detergent having no harmful effects on the poultry. A fifth pipe 19 is connected at 20 to the fourth pipe 16 and this fifth pipe 19 leads, via a filter 21, to one side of the closure member of a relief valve 22. This relief valve 22 is shown in more detail in FIG. 3. The port of relief valve 22 to which pipe 19 is connected, is indicated at 23 in FIG. 3 and the closure member is indicated at 24. A sixth pipe 25 leads from a port 26 on the other side of the closure member 24 of the relief valve 22 and this sixth pipe 25 is connected at 27 to the third pipe 15. Within the pipe 16 there is fitted a pressure gauge 28.

Referring now to FIG. 3 which shows the relief valve 22 in more detail, it will be seen that the relief valve 22 has a tubular T-shaped housing with the shank thereof forming the inlet port 23 and one arm of the T-piece acting as the outlet port 26. Provided within the housing is an annular seat 29 of any known form and in this particular embodiment the seat 29 is positioned at the junction between one arm and the shank. Co-operating with the seat 29 is the valve closure member 24 previously mentioned which may also be of any known form, for example, a truncated cone, and a rod 30 is attached to the closure member and extends into the other arm of the housing. This other arm forms a cylinder 31 and at this end of the rod 30 is a piston 32 with a sealing member 33 so that the piston 32, sealing member 33, rod 30 and valve closure member 24 move in unison. Means may be provided for guiding the rod 30 in its movement.

The outer surface of the other arm is screw threaded for the reception of an internally screw-threaded cap 34 provided with a pressure release aperture 35 at its closed end. Within the cap 34 and bearing against the outside of the piston 32 is a spring 36 which is the bias for the closure member 24.

In operation, the reservoir 1 is filled with liquid by passing the liquid from a liquid source via pipe 14 through the three way valve 12 and discharging the liquid into the reservoir 1 through pipe 13. When the appliance has been moved to a position for use, the pump 9 operates to draw liquid from the reservoir 1 and feeds the liquid via pipes 15 and 16 to the lance 17 when the control valve 18 is opened. During this part of the operation the relief valve 22 is closed by the biasing of spring 36. Suitable detergents will have been mixed with the water in reservoir 1 and cleaning of the poultry house will take place.

When the control valve 18 is turned to the "off" position, the pump 9 will continue to increase the liquid pressure on its delivery side i.e. in pipe 16, and the pressure will build up until the setting of the relief valve 22 is reached, whereupon the relief valve 22 will blow and allow liquid to flow through the recirculatory pipework consisting of pipes 19 and 25 and parts of pipes 15 and 16. Thus, the pressure within the system is kept at a preset maximum without varying the output of the pump and hence the pump 9 cannot be overloaded. Also, because the liquid moved by the pump is recirculated when the control valve 18 is shut, there will be little or no agitating effect on the liquid stored in the reservoir 1. This is of importance if the detergent is of the foaming variety as otherwise considerable foam may be generated in the reservoir.

After hot water has been sprayed on to the parts to be cleaned, it is frequently necessary to wash down those parts with cold water direct from the mains. For this purpose, the three way valve 12 will be moved to a position in which the pipe 14 communicates with pipe 15 and the pump 9 will pump cold water through the lance 17. During this part of the operation it is sometimes found that the pressure from the mains within pipe 14 is very high and is subjected to fluctuation. This results in a pressure within pipe 25 so that if the relief valve 22 had been of standard type, the back pressure in pipe 25 would have tended to keep the valve closed with a consequent overloading of pump 9. However, with the relief valve as described in relation to FIG. 3, any back pressure which is present in pipe 25 assists in opening the release valve so that the pump cannot be overloaded. For example, if the incoming mains pressure is, for example, 40 p.s.i. and the pump delivery pressure is 120 p.s.i. there is a resultant 160 p.s.i. available for washing down.

It will be appreciated that the system of the invention is applicable whenever liquid is to be drawn from a reservoir at atmosphere pressure and discharged at increased pressure and provides simple apparatus which is easy to maintain and which cannot be readily damaged even though misused. In the particular application described above, i.e. the cleansing of poultry houses, the effectiveness of detergents and germicides is enhanced when they are utilised hot and under pressure and this is done by the apparatus of the invention.

I claim:

1. Apparatus for discharging liquid under pressure, including a reservoir for the storage of liquid, a three way valve having three ports, a first pipe leading from the reservoir to a first port of said three way valve, a second pipe connected to a second port of said three way valve for the supply of liquid from a liquid source, a pump for creating pressure within said liquid, a third pipe connected to a third port of said three way valve and leading to the inlet side of said pump, liquid directing means through which said pressurised liquid may be discharged, a control valve manually operable and associated with said liquid directing means for controlling the discharge of said pressurised liquid through said liquid directing means, a fourth pipe leading from the outlet side of said pump through said control valve to said liquid directing means, a relief valve comprising a closure member biased to the closed position and a piston operatively associated with said closure member, a fifth pipe leading from said fourth pipe to an inlet port of said relief valve between one side of said closure member and said piston, a sixth pipe leading from an outlet port of said relief valve on the other side of said closure member to said third pipe, the fifth and sixth pipes forming a closed circuit with parts of said third and fourth pipes and said closed circuit incorporating said pump and said relief valve.

References Cited

UNITED STATES PATENTS

| | | | |
|---|---|---|---|
| 2,700,397 | 1/1955 | Compton | 137—569 |
| 3,119,322 | 1/1964 | Valente | 137—569 |
| 3,212,518 | 10/1965 | Padek | 137—563 |

FOREIGN PATENTS

| | | |
|---|---|---|
| 875,297 | 8/1961 | Great Britain. |
| 979,681 | 12/1950 | France. |
| 1,117,667 | 2/1956 | France. |

M. CARY NELSON, *Primary Examiner.*

WILLIAM R. CLINE, *Assistant Examiner.*